US009257065B2

(12) United States Patent
Watanabe

(10) Patent No.: US 9,257,065 B2
(45) Date of Patent: Feb. 9, 2016

(54) LIQUID CRYSTAL DISPLAY APPARATUS COMPRISING FIRST AND SECOND GROUNDING ROUTES AND MANUFACTURING METHOD OF THE LIQUID CRYSTAL DISPLAY APPARATUS

(71) Applicant: MITSUBISHI ELECTRIC CORPORATION, Tokyo (JP)

(72) Inventor: Kenichi Watanabe, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/297,925

(22) Filed: Jun. 6, 2014

(65) Prior Publication Data
US 2014/0368763 A1 Dec. 18, 2014

(30) Foreign Application Priority Data

Jun. 12, 2013 (JP) ................................. 2013-123972

(51) Int. Cl.
G02F 1/1333 (2006.01)
G02F 1/1345 (2006.01)
G09G 3/00 (2006.01)
G09G 3/36 (2006.01)
G02F 1/1343 (2006.01)

(52) U.S. Cl.
CPC ............ *G09G 3/006* (2013.01); *G02F 1/13452* (2013.01); *G09G 3/3648* (2013.01); *G02F 1/134363* (2013.01); *G02F 2001/133334* (2013.01); *G09G 2300/0417* (2013.01); *G09G 2300/0426* (2013.01); *G09G 2300/0434* (2013.01)

(58) Field of Classification Search
CPC ....................... G09G 2300/0417; G09G 3/006
USPC .................................................. 349/150–152
See application file for complete search history.

(56) References Cited

U.S. PATENT DOCUMENTS

| 5,870,160 | A | 2/1999 | Yanagawa et al. |
| 6,034,757 | A | 3/2000 | Yanagawa et al. |
| 6,108,066 | A | 8/2000 | Yanagawa et al. |
| 2010/0156857 | A1* | 6/2010 | Nozaki .......................... 345/204 |
| 2011/0304564 | A1* | 12/2011 | Kim et al. ..................... 345/173 |
| 2013/0083275 | A1* | 4/2013 | Ai ..................... G02F 1/133308 349/106 |

FOREIGN PATENT DOCUMENTS

| JP | 3645834 B2 | 5/2005 |
| JP | 2009-020272 A | 1/2009 |
| JP | 2011-170200 A | 9/2011 |

* cited by examiner

*Primary Examiner* — Paul Lee
(74) *Attorney, Agent, or Firm* — Studebaker & Brackett PC

(57) ABSTRACT

A liquid crystal display apparatus includes: a display device a first substrate having a pixel electrode and a reference electrode, a second substrate facing the first substrate; a flexible substrate; a housing that accommodates the display device; a transparent conductive film that is formed on a surface of the second substrate; a first conductive member and a second conductive member, wherein one end portion of the first conductive member and one end portion of the second conductive member are connected to the transparent conductive film; a first grounding route, which is configured by at least the first conductive member that is connected to a grounding wiring formed at the peripheral part of the first substrate and the flexible substrate; and a second grounding route, which is configured by at least the second conductive member that is connected to the housing.

12 Claims, 2 Drawing Sheets

LIQUID CRYSTAL DISPLAY APPARATUS COMPRISING FIRST AND SECOND GROUNDING ROUTES AND MANUFACTURING METHOD OF THE LIQUID CRYSTAL DISPLAY APPARATUS

CROSS-REFERENCE TO RELATED APPLICATION

This application claims priority from Japanese Patent Application No. 2013-123972 filed on Jun. 12, 2013, the entire subject matter of which is incorporated herein by reference.

TECHNICAL FIELD

This disclosure relates to a liquid crystal display apparatus and a manufacturing method of the liquid crystal display apparatus.

BACKGROUND

In a liquid crystal display apparatus, specifically, in a horizontal electric field type liquid crystal display apparatus, one of two transparent substrates, which are arranged to face each other with a liquid crystal layer being interposed therebetween, is provided with a display electrode and a reference electrode. An electric field, which is generated parallel with the transparent substrates between the display electrode and the reference electrode, modulates light penetrating the liquid crystal layer.

In the horizontal electric field type liquid crystal display apparatus, the other transparent substrate is apt to be charged due to external causes, and then liquid crystals enclosed inside the apparatus are influenced by the static electricity, so that a display may be distorted. For this reason, measures that a transparent conductive film is provided on a surface of the transparent substrate at an outer side of the liquid crystal layer and is grounded have been taken for the horizontal electric field type liquid crystal display apparatus (for example, refer to JP-B-3645834).

A liquid crystal display apparatus disclosed in JP-B-3645834 has a shield function against the static electricity from the outside by grounding the transparent conductive film provided on the surface of the transparent substrate at the outer side of the liquid crystal layer. However, when the transparent conductive film is disconnected from the grounding, a screen display is distorted by the influence of the static electricity from the outside.

In the meantime, when there is no technology of checking a grounding resistance of a conductive member for electrical connection from the transparent conductive film to the transparent substrate having the pixel electrode and the reference electrode, the check is made by a sensory inspection for checking an outward appearance of the conductive member.

SUMMARY

A liquid crystal display apparatus of this disclosure includes: a display device that includes a first substrate having a pixel electrode and a reference electrode, a second substrate facing the first substrate, and a liquid crystal sandwiched between the first substrate and the second substrate and that applies an electric field between the reference electrode and the pixel electrode; a flexible substrate that is mounted at a peripheral part of the first substrate; a housing that accommodates the display device; a transparent conductive film that is formed on a surface of the second substrate, which is a surface opposite to a side of the liquid crystal; a first conductive member and a second conductive member, wherein one end portion of the first conductive member and one end portion of the second conductive member are connected to the transparent conductive film; a first grounding route, which is configured by at least the first conductive member that is connected to a grounding wiring formed at the peripheral part of the first substrate and the flexible substrate; and a second grounding route, which is configured by at least the second conductive member that is connected to the housing. Meanwhile, a manufacturing method of the crystal display apparatus according to this disclosure includes forming a first conductive member at the peripheral part of the first substrate and a wiring, which is connected to the first conductive member, on the flexible substrate so that a first grounding route including the first conductive member and the wiring is formed, and forming a second conductive member to be connected to the housing so that a second grounding route is formed. The manufacturing method of the crystal display apparatus according to this disclosure may includes measuring a resistance value between the first grounding and the second grounding route by using a resistance meter.

According to the liquid crystal display apparatus and the inspection method thereof disclosed in this disclosure, even when one grounding route of the electrical connection grounding the transparent conductive film is broken, the grounding of the transparent conductive film is maintained. Also, by checking the resistance value between the independent grounding routes, it is possible to improve the reliability of the grounding connection of the transparent conductive film and also to improve the reliability of a display quality of the liquid crystal display apparatus.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Illustrative Embodiment

Figure 1:
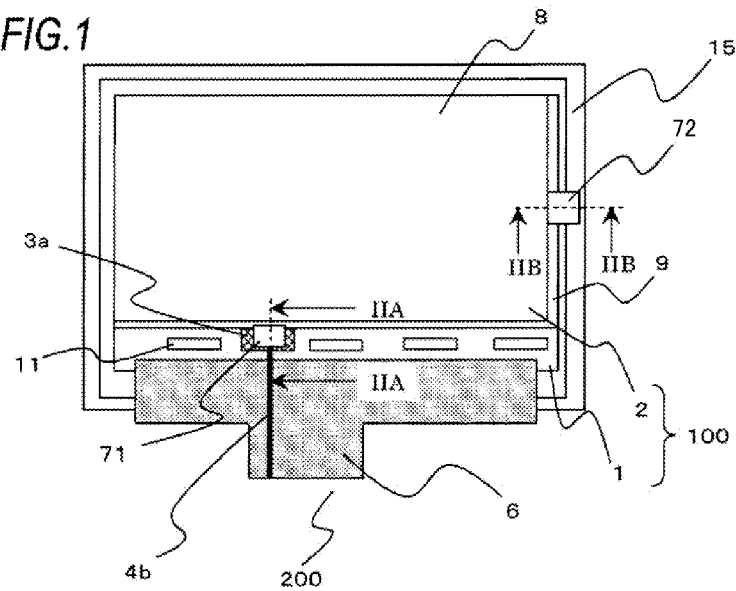
FIG. 1 is a plan view of a liquid crystal display apparatus according to an illustrative embodiment of this disclosure.
Figure 2A:
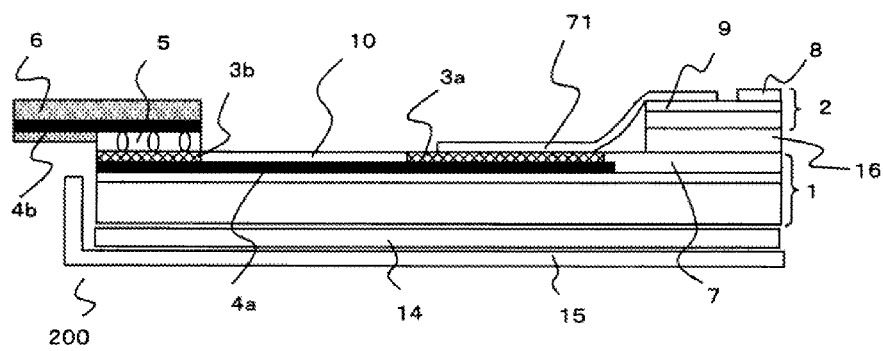
FIG. 2A is a sectional view taken along a dotted line IIA-IIA of FIG. 1
Figure 2B:
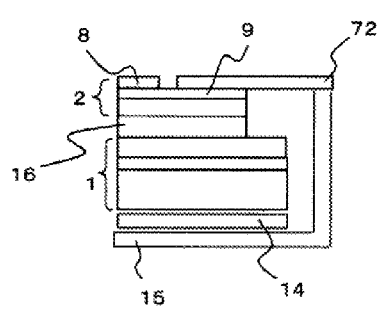
FIG. 2B is a sectional view taken along a dotted line IIB-IIB of FIG. 1.

Hereinafter, illustrative embodiments of this disclosure will be described. FIG. 1 is a plan view of a liquid crystal display apparatus according to an illustrative embodiment of this disclosure, FIG. 2A is a sectional view taken along a dotted line IIA-IIA of FIG. 1 and FIG. 2B is a sectional view taken along a dotted line IIB-IIB of FIG. 1.

A structure of a liquid crystal display apparatus 200 is described with reference to FIGS. 1, 2A and 2B. A display device 100 configuring the liquid crystal display apparatus 200 has a display part, in which a plurality of pixel electrodes is formed thereon and a liquid crystal layer 16 is sandwiched between two opposing insulating substrates (for example, glass substrates), i.e., a first substrate that is an electrode substrate 1 and a second substrate that is a counter substrate 2. On the electrode substrate 1, a plurality of gate wirings and a plurality of source wirings are arranged. In the vicinity of intersecting portions of the wirings, thin film transistors that are switching elements are arranged. The pixel electrodes that are connected to the thin film transistors are arranged in a matrix shape (all of which are not shown).

Also, the counter substrate 2 is formed with a counter electrode made of a transparent conductive film, a colored filter layer for color display, a black matrix arranged between respective pixels and the like. The electrode substrate 1 and the counter substrate 2 are overlapped with the liquid crystal layer 16 and a spacer, which are interposed therebetween, and are sealed by a seal material (not shown).

Also, the display device 100 of this illustrative embodiment adopts a chip on glass (COG) manner in which a driver IC 11 supplying outside power is directly formed on terminals of the gate wirings and source wirings formed on a outside of a display area of the electrode substrate 1. A wiring of the driver IC 11 is connected to a control substrate (not shown) through a flexible printed circuit (flexible substrate; FPC) 6. Also, the display device 100 has a backlight 14 illuminating light to a backside of the electrode substrate 1 and is accommodated in a housing 15, thereby configuring the liquid crystal display apparatus 200.

In the meantime, the liquid crystal display apparatus 200 of this illustrative embodiment is a horizontal electric field type liquid crystal display apparatus, in which the pixel electrode and a reference electrode are provided in a pixel area and an electric field that is generated parallel with the electrode substrate 1 between the pixel electrode, which is driven by the gate wiring, and the reference electrode modulates light penetrating the liquid crystal layer.

As shown in FIG. 2A, a transparent conductive film 9 is formed at least in a display area of a surface of the counter substrate 2, which is a display surface. A polarization plate 8 is arranged on a surface of the transparent conductive film 9 so that it exposes a part of the transparent conductive film 9. The transparent conductive film 9 on the counter substrate 2, which is not covered by the polarization plate 8 with being exposed, is attached and is conductively connected to an electrode terminal 3a on the electrode substrate 1 by a first conductive member 71.

Also, a grounding wiring 4a is provided on the electrode substrate 1 located at the outside of the display area (hereinafter, referred to as a peripheral part of the electrode substrate 1), and the electrode terminal 3a is formed at an outer side of the counter substrate 2 on the grounding wiring 4a of the electrode substrate 1. Also, an electrode terminal 3b is provided on the grounding wiring 4a and in the vicinity of an end portion of the peripheral part of the electrode substrate 1. A protective film 10 is formed between the electrode terminal 3a and the electrode terminal 3b. An insulation film 7 is formed at an inner side of the electrode terminal 3a and the grounding wiring 4a.

In the liquid crystal display apparatus 200 of this illustrative embodiment, the electrode terminal 3a is provided at the peripheral part of the electrode substrate 1, and the electrode terminal 3a is provided with a first grounding route, through which the electrode terminal 3a is connected to a grounding wiring 4b formed in the FPC 6 via the grounding wiring 4a on the electrode substrate 1, the electrode terminal 3b and an anisotropic conductive film (ACF) 5.

In this way, the transparent conductive film 9 in the display area is connected to the grounding wiring 4b formed in the FPC 6 and can be thus grounded.

Also, as shown in FIG. 2B, one end portion of a second conductive member 72 is adhered to an end portion of a side different from a side of the end portion of the electrode substrate 1 at which the first conductive member 71 is adhered. The other end portion of the second conductive member 72 is adhered to the housing 15, which is made of a material containing metal, configuring the liquid crystal display apparatus 200, so that a second grounding route is formed. The second conductive member 72 will be configured by a conductive tape, a metallic paste and the like.

In the below, a method of manufacturing the liquid crystal display apparatus 200 according to this illustrative embodiment is described. First, a metal film of Cr, Al, Ta, Ti, Mo and the like or an alloy film having the metal component as a main component is formed on a transparent insulating substrate such as alkali-free glass (for example, product name AN635) by a sputtering method and is then patterned by a photolithography technology. As a result, a gate electrode, a gate wiring of a display part, a gate wiring of an electrode terminal part and the like are formed at the same time.

Subsequently, an SiN film is further formed using plasma CVD and the like, so that a gate insulating film is formed. Then, an amorphous Si to be a channel layer and N+ type amorphous Si to be a contact layer are continuously formed on the gate electrode, the gate wiring and the gate insulating film. After the film formation, the film is patterned using the photolithography technology, so that thin film transistors for driving respective display elements of the display part are formed. Further, a metal film of Cr, Al, Mo and the like or an alloy film having the metal component as a main component is formed by the sputtering and is then patterned by the photolithography technology, so that a drain electrode and a source electrode of the display part, a source wiring of the display part, a source wiring of the electrode terminal part and the like are formed at the same time.

Then, in order to suppress a DC component from being applied to the liquid crystal layer 16, an SiN film is formed using the plasma CVD, so that the protective film 10 is formed. Thereafter, an insulating film of the electrode terminal part of the gate and source wirings is removed. Finally, an indium tin oxide (ITO) film is formed by the sputtering and is patterned by the photolithography technology, so that the pixel electrodes are formed. At the same time, the electrode terminals 3a, 3b of the gate and source wirings and the like of the electrode terminal part are also formed. By forming the ITO film, the electrode terminals 3a, 3b made of the wiring material such as Cr, Al and the like are not exposed and an oxide film is suppressed from being formed on the electrode terminals 3a, 3b, so that it is possible to suppress the conduction defect with the outside input. By the above manufacturing method, the electrode substrate 1 of the liquid crystal display apparatus 200 according to this illustrative embodiment is completed. The electrode substrate 1 is adhered with the counter substrate 2 with being overlapped, and the liquid crystals are injected therebetween. The transparent conductive film 9 is formed at least in the display area of the surface of the counter substrate 2 configuring the liquid crystal display apparatus 200, which is a display surface. The polarization plate 8 is arranged on the surface of the transparent conductive film 9 so that it exposes a part of the transparent conductive film 9. The display device 100 configured in this way is accommodated in the housing 18 made of a material containing the metal, together with the backlight 14 illuminating the backside of the display device.

In the below, a method of mounting the driver IC 11 on the electrode substrate 1 is described. First, the ACF 5 is adhered on the electrode terminal 3b formed on the peripheral part at the outside of the display area of the electrode substrate 1. Then, a plurality of bumps made of Au, which are formed on a backside of the driver IC 11, and the electrode terminals 3a, 3b are aligned with high precision, which are then thermally compressed using a heating/pressing tool. Thereby, the driver IC 11 is electrically connected to the electrode terminals 3a, 3b of the display device 100 by conductive particles of the ACF 5, which is arranged between the bumps of the driver IC 11 and the electrode terminal 3b.

Finally, an insulative coating material is applied to the electrode terminal part (including the electrode terminals 3a, 3b) between the driver IC 11 and the FPC 6. As the coating material, a silicon resin, an acryl resin, a fluorine resin, an urethane resin or the like is mainly used, and the coating material is applied by using a dispenser. When the coating material is applied to the electrode terminal part, it is possible to suppress corrosion of the wirings (not shown).

Figure 3:
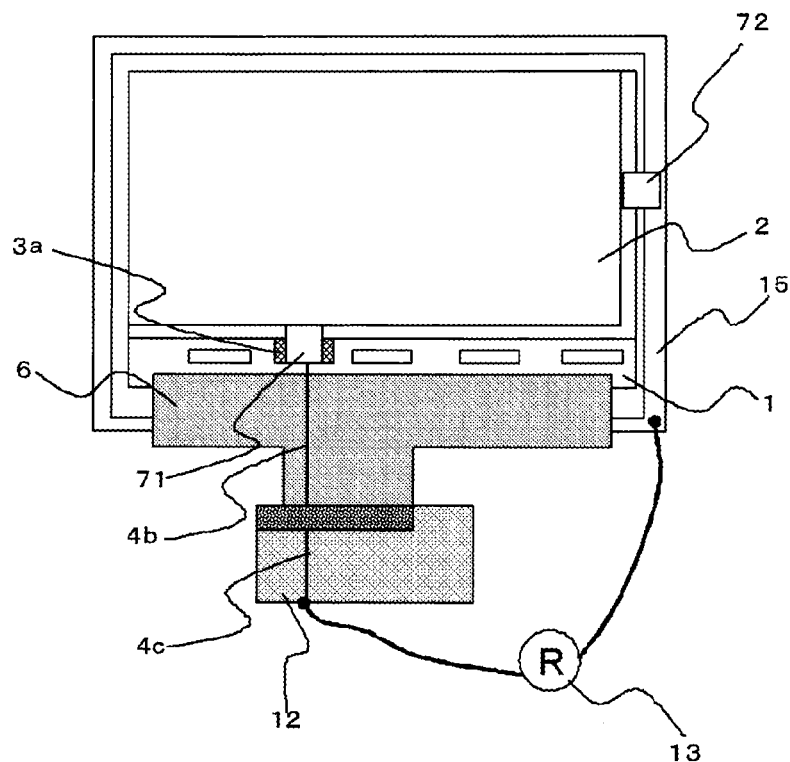
FIG. 3 is a plan view showing an inspection method (manufacturing method) of the liquid crystal display apparatus according to an illustrative embodiment of this disclosure.

In the below, an inspection method for checking conduction to the transparent conductive film 9 of the liquid crystal display apparatus 200 according to this illustrative embodiment is described with reference to FIG. 3 where a grounding checking substrate 12 is attached. As shown in FIG. 3, a grounding checking wiring 4c corresponding to the grounding wiring 4b of the FPC 6 is connected on the grounding checking substrate 12, and the wirings are connected to one side of a resistance meter 13. Then, the FPC 6 and the grounding checking substrate 12 are connector-connected. Also, the other side of the resistance meter 13 is connected to the housing 15. In this way, the first grounding route and the second grounding route are connected to the resistance meter 13 and a resistance value between the grounding routes is measured by the resistance meter 13. Thereby, it is possible to check the conduction to the transparent conductive film 9, thereby improving the reliability.

Additionally, after the inspection, the grounding checking wiring 4c and the resistance meter 13, which are used for checking of grounding (conduction), will be detached. As described above, the electrode substrate 1 is formed, the driver IC 11 is mounted thereon, and then then inspection method for checking conduction is performed, so that the liquid crystal display apparatus 200 is manufactured. A manufacturing method of the electrode substrate 1, a mounting method of the driver IC 11, and the inspection method is not limited to above methods, the method can be modified without departing from the scope of this disclosure.

As described above, the horizontal electric field type liquid crystal display apparatus 200 of this illustrative embodiment has the multiple grounding routes by which the transparent conductive film 9 formed on the counter substrate 2 is grounded. Thereby, even when one grounding route is broken, it is possible to maintain the grounding of the transparent conductive film 9. Therefore, a shield function against the static electricity from the outside is obtained, and also, even when the grounding of the transparent conductive film 9 is disconnected, the other grounding route still exists, so that it is possible to suppress the screen display from being distorted due to the influence of the static electricity from the outside.

Also, it is possible to check the resistance value between the grounding routes without relying on the sensory inspection for checking an outward appearance. Thereby, the reliability of the grounding connection of the transparent conductive film 9 is improved, so that the reliability of the display quality of the liquid crystal display apparatus 200 is improved.

In the meantime, the grounding routes of the transparent conductive film 9 includes the first grounding route, which connects the electrode terminals 3a, 3b provided on the electrode substrate 1 with the grounding wiring 4b provided in the FPC 6, and the second grounding route, which is grounded to the housing configuring the liquid crystal display apparatus 200. However, each grounding route may have multiple routes. Thereby, the reliability of the grounding connection of the transparent conductive film 9 can be further improved. Furthermore, in the above illustrative embodiment, the first grounding route is connected to the grounding wiring 4b of the FPC 6 via the electrode substrate 1. However, a further grounding route that is not connected to the grounding wiring 4b formed in the FPC 6 may be additionally provided. The grounding route may be also connected to a connector terminal for an external signal and a power supply, for example. Thereby, it is possible to check the grounding connection by inspecting a lighting. Also, as another example, the grounding route may be connected to an inspection pad that is provided for the FPC 6 or control substrate.

Figure 4:
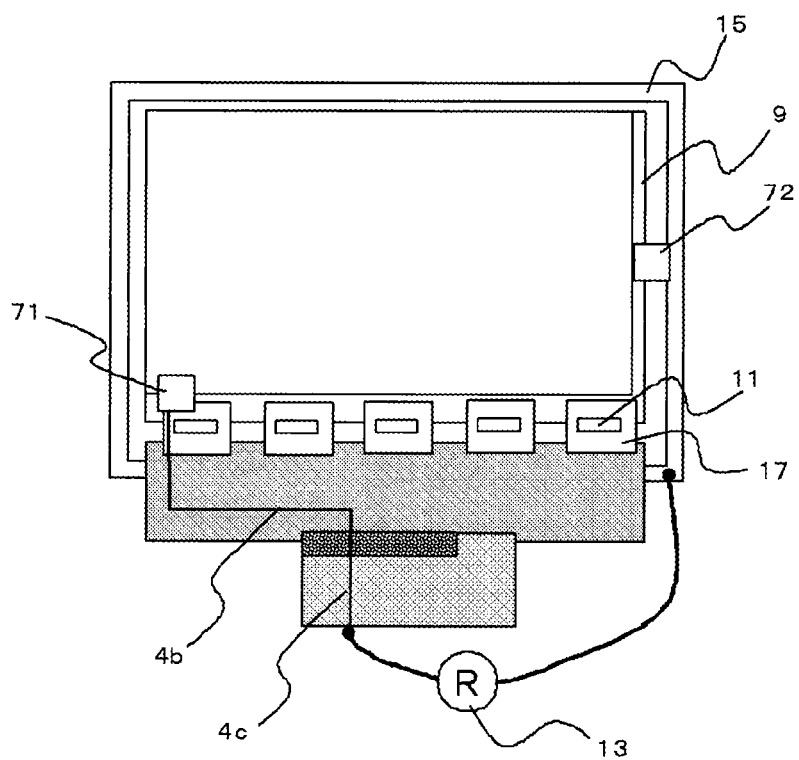
FIG. 4 is a plan view of the liquid crystal display apparatus according to an illustrative embodiment of this disclosure.

In the above illustrative embodiment, the COG manner is adopted. However, as shown in FIG. 4, a chip on film (COF) manner in which the driver IC 11 is mounted to a film-shaped substrate 17 adopted instead of the COG manner. In a COF type liquid crystal display apparatus, a film-shaped substrate 17 having the driver IC mounted thereon configures a grounding wiring and configures a first grounding route connected by the FPC 6 and the ACF 5.

What is claimed is:

1. A liquid crystal display apparatus comprising:
    a horizontal electric field type display device that comprises a first substrate having a pixel electrode and a reference electrode, a second substrate facing the first substrate, and a liquid crystal sandwiched between the first substrate and the second substrate and that applies an electric field between the reference electrode and the pixel electrode;
    a flexible substrate that is mounted at a peripheral part of the first substrate;
    a housing that accommodates the display device;
    a transparent conductive film that is formed on a surface of the second substrate, which is a surface opposite to a side of the liquid crystal;
    a first conductive member and a second conductive member, wherein one end portion of the first conductive member and one end portion of the second conductive member are in contact with the transparent conductive film;
    a first grounding route, which is configured by at least the first conductive member that is connected to a grounding wiring formed at the peripheral part of the first substrate and the flexible substrate; and
    a second grounding route, which is configured by at least the second conductive member that is connected to the housing.

2. The liquid crystal display apparatus according to claim 1,
    wherein the first grounding route is connected to a grounding terminal formed on the flexible substrate.

3. The liquid crystal display apparatus according to claim 1,
    wherein the first grounding route is connected to at least one of an inspection pad and a connector terminal of the flexible substrate.

4. A manufacturing method of a liquid crystal display apparatus, the apparatus comprising: a display device that comprises a first substrate having a pixel electrode and a reference electrode, a second substrate facing the first substrate, and a liquid crystal sandwiched between the first substrate and the second substrate and that applies an electric field between the reference electrode and the pixel electrode; a flexible substrate that is mounted at a peripheral part of the first substrate; a housing that accommodates the display device; a transparent conductive film that is formed on a surface of the second substrate, which is a surface opposite to a side of the liquid crystal; the method comprising:

forming a first conductive member at the peripheral part of the first substrate and a wiring, which is connected to the first conductive member, on the flexible substrate so that a first grounding route including the first conductive member and the wiring is formed; and forming a second conductive member to be connected to the housing so that a second grounding route is formed, wherein one end portion of the first conductive member and one end portion of the second conductive member are in contact with the transparent conductive film.

5. The manufacturing method of the liquid crystal display apparatus according to claim 4, further comprising measuring a resistance value between the first grounding and the second grounding route by using a resistance meter.

6. The manufacturing method of the liquid crystal display apparatus according to claim 4, wherein the first conductive member is not in direct electrical contact with the second conductive member.

7. The manufacturing method of the liquid crystal display apparatus according to claim 4, wherein the first conductive member is spaced from the second conductive member such that the first and second grounding routes are separate from one another.

8. A liquid crystal display apparatus comprising:

a horizontal electric field type display device that comprises a first substrate having a pixel electrode and a reference electrode, a second substrate facing the first substrate, and a liquid crystal sandwiched between the first substrate and the second substrate and that applies an electric field between the reference electrode and the pixel electrode;

a flexible substrate that is mounted at a peripheral part of the first substrate;

a housing that accommodates the display device;

a transparent conductive film that is formed on a surface of the second substrate, which is a surface opposite to a side of the liquid crystal;

a first conductive member and a second conductive member, wherein one end portion of the first conductive member and one end portion of the second conductive member are connected to the transparent conductive film;

a first grounding route, which is configured by at least the first conductive member that is connected to a grounding wiring formed at the peripheral part of the first substrate and the flexible substrate; and a second grounding route, which is configured by at least the second conductive member that is connected to the housing, wherein the first conductive member is not in direct electrical contact with the second conductive member.

9. The liquid crystal display apparatus according to claim 8, wherein the first grounding route is connected to a grounding terminal formed on the flexible substrate.

10. The liquid crystal display apparatus according to claim 8, wherein the first grounding route is connected to at least one of an inspection pad and a connector terminal of the flexible substrate.

11. The liquid crystal display apparatus according to claim 8, wherein the first conductive member is spaced from the second conductive member such that the first and second grounding routes are separate from one another.

12. The liquid crystal display apparatus according to claim 1, wherein the first conductive member is spaced from the second conductive member such that the first and second grounding routes are separate from one another.

* * * * *